S. NEILL.
Sod-Planter.

No. 224,032. Patented Feb. 3, 1880.

Witnesses
Inventor:
Stewart Neill

UNITED STATES PATENT OFFICE.

STEWART NEILL, OF CHILLICOTHE, ILLINOIS.

SOD-PLANTER.

SPECIFICATION forming part of Letters Patent No. 224,032, dated February 3, 1880.

Application filed December 26, 1878.

*To all whom it may concern:*

Be it known that I, STEWART NEILL, of the town of Chillicothe, in the county of Peoria, in the State of Illinois, have invented an Improvement in Sod-Planters; and I do hereby declare that the following is a full, clear, and exact description thereof, reference being had to the annexed drawings, making a part of this specification, in which like letters of reference refer to like parts, and in which—

Figure 1:
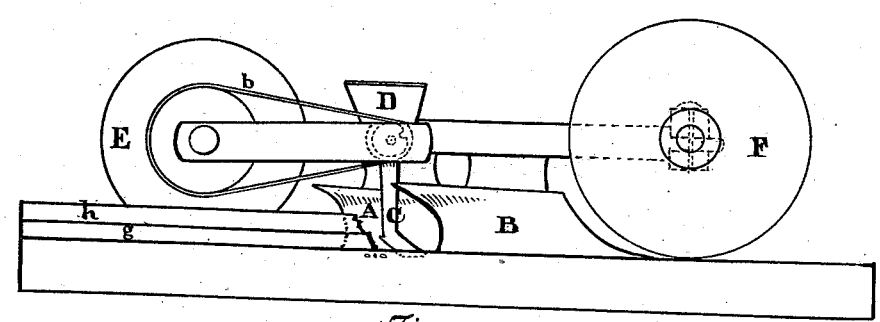
Figure 2:
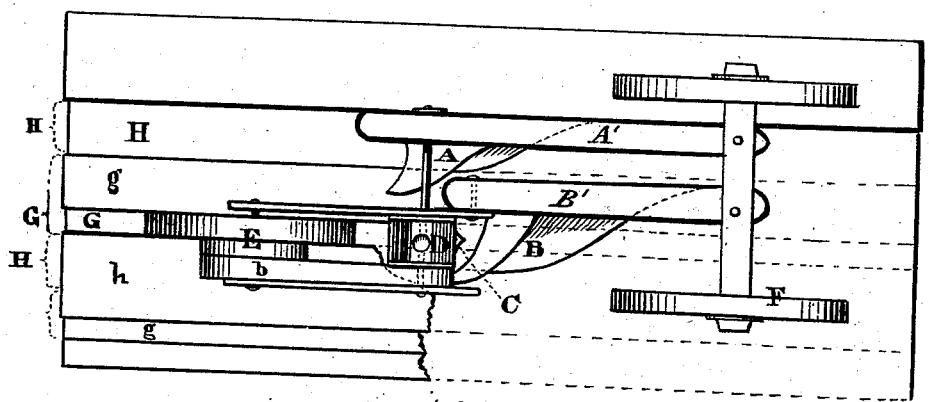
Figure 3:
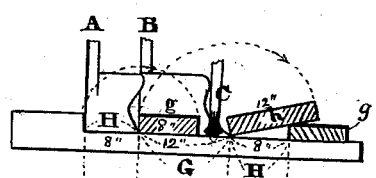

Figure 1 is a side elevation of the improved plow and planter. Fig. 2 is a plan view of the same. Fig. 3 is a transverse section, showing the sods, the furrows, with plows and drill or subsoiling-planter.

The object of this invention is to effect the first breaking of prairie-sod, and also the planting, with the least amount of labor, in such a manner as to obtain the best possible crop. To accomplish this at one operation I use a gang-plow having plows of different widths, alternately wide and narrow, so that the sod turned over by a narrow plow falls into the furrow made by a wide plow, leaving a few inches space for planting, and the sod turned by a wide plow laps over the sod turned by a narrow one, a seed-drill being secured in position to move along in the planting-space.

I prefer to use two plows for the efficient operation of my device, the left-hand or land-side plow being about eight inches in width and the other plow about twelve inches in width, so that the sod turned over by the wide plow laps over the sod previously turned by the narrow one about four inches, and the sod turned by the narrow plow falls flat in the furrow left by the wide plow, and within about four inches of the wide sod.

A designates the narrow or land-side plow, preferably eight inches wide, secured to the plow-beam A'. B is the wide plow, preferably twelve inches wide, secured to the beam B', the plow B being fixed a suitable distance farther forward than the plow A, and both plows being arranged so that the furrows made by both adjoin.

Fixed at the rear of the plow B, and just within the line of the wing of said plow, is a seed-drill or subsoiling-planter, C, which has a seed-box, D.

The seed-drill may be provided with suitable dropping mechanism connecting with a special wheel, or with the seed-covering wheel E; or the dropping mechanism may be operated by hand.

It will be observed that the seed-drill C is located so that it moves along with the machine in the track or space left between the wide and narrow sods.

Fig. 3 illustrates, in transverse section, the furrows and sods where the machine has passed. G is the twelve-inch furrow, and H the eight-inch furrow. *g* is the narrow sod turned over into the furrow left by the wide sod *h*, leaving planting-space of four inches, along and in which the drill C passes, and the wide sod *h* laps over the sod *g*, as shown.

The number of furrows and rows for planting is only limited by the capacity of the machine, which may be provided with more than two plows, the same being made alternately wide and narrow, and one seeder or drill being provided for every two plows.

I claim as my invention—

1. In a sod-planter, two or more gang-plows of different widths, arranged alternately, one wide and the next narrow, so that the sod turned by the narrow plow falls into the furrow left by the wide plow and leaves a planting-space uncovered by the sods, for the purpose set forth.

2. A sod-planter having two or more plows of different widths, placed alternately, one wide and the next narrow, and one being placed farther forward than the next, in combination with a seed-drill fixed in position to move in the planting-space between the sods, as and for the purposes set forth.

In testimony that I claim the foregoing invention I have hereunto set my hand this 16th day of December, 1878.

STEWART NEILL.

Witnesses:
J. M. MORSE,
H. W. WELLS.